United States Patent [19]

Lu

[11] Patent Number: 5,774,939
[45] Date of Patent: *Jul. 7, 1998

[54] POSITIONING PIVOT

[76] Inventor: Sheng-nan Lu, No. 174, Chunying St., Shulin Chen, Taipei Hsien, Taiwan

[21] Appl. No.: 638,292

[22] Filed: Apr. 26, 1996

[*] Notice: The term of this patent shall not extend beyond the expiration date of Pat. No. 5,503,491.

[51] Int. Cl.⁶ .................... E05D 11/08; E05C 17/64
[52] U.S. Cl. .................... 16/342; 16/340; 16/273; 403/86; 403/103; 403/104
[58] Field of Search .................... 16/338, 339, 340, 16/341, 342, 273; 403/290, 86, 91, 103, 104, 109

[56] References Cited

U.S. PATENT DOCUMENTS

| | | | |
|---|---|---|---|
| 1,944,601 | 1/1934 | Gulick | 403/290 |
| 2,647,001 | 7/1953 | Andersson | 403/290 |
| 3,087,193 | 4/1963 | Eskridge et al. | 16/273 |
| 3,321,865 | 5/1967 | Maxam, Jr. | 403/290 |
| 4,524,484 | 6/1985 | Graham | 403/290 |
| 4,673,376 | 6/1987 | Fender | 403/290 |
| 4,948,149 | 8/1990 | Lin et al. | 403/104 |
| 5,333,356 | 8/1994 | Katagiri | 16/342 |
| 5,503,491 | 4/1996 | Lu | 16/339 |

Primary Examiner—Randolph A. Reese
Assistant Examiner—Donald M. Gurley
Attorney, Agent, or Firm—Hedman, Gibson & Costigan, P.C.

[57] ABSTRACT

A friction adjustable positioning pivot includes a first shaft including a tapering threaded rod which defines a hollow space therein and a slot along a periphery thereof. An urging tube includes an inner threaded periphery for rotatably threading onto the tapering threaded rod of the first shaft and an inner smooth tapering periphery adjacent to the inner threaded periphery for limiting the tapering threaded rod to thread into the urging tube at a constant direction. A second shaft includes a rod portion which is received in the hollow space of the tapering threaded rod of the first shaft and is in contact with an inner periphery of the tapering threaded rod. The first shaft and the second shaft are rotatably retained at a relative angle due to a friction resulted from the rod portion of the second shaft against the inner periphery of the tapering rod of the first shaft, whereby the urging tube is allowed to be manually threaded onto the tapering rod of the first shaft thus tightening the tapering rod of the first shaft from radial direction thereby increasing friction between the first shaft and the second shaft.

2 Claims, 4 Drawing Sheets

POSITIONING PIVOT

BACKGROUND OF THE INVENTION

1. Field of the Invention

The present invention relates to a positioning pivot which maintains a rotational position after being manually rotated, and more particularly to a friction adjustable positioning pivot whose friction is manually adjustable before it is used for different loads.

2. Description of the Prior Art

Positioning pivots are commonly used in many casing structures such as a notebook computer. FIG. 4 illustrates a conventional positioning pivot in cross-sectional view used in any pivotable casing structure. The conventional positioning pivot comprises a first shaft 90 connected to a cylinder 91, a resistance tube 92 made of engineering plastic being received in the cylinder 91, and a second shaft 93 being received in the resistance tube 92. The first shaft 90 and the second shaft 93 are in alignment with each other and are allowed to be rotated with respect to each other. The resistance tube 92 has an outer periphery in contact with an inner periphery of the cylinder 91 and an inner periphery thereof in contact with the second shaft 93. Therefore, the second shaft 93 is pivotable with respect to the resistance tube 92 and the resistance tube 92 is pivotable with respect to the cylinder 91. Since the cylinder 91 is firmly connected to the first shaft 90, the resistance tube 92 is also pivotable with respect to the first shaft 90. Normally the first shaft 90 is attached to a cover such as the screen panel of a notebook computer and the second shaft 93 is attached to a base such as a main body of the notebook computer or vice versa. The first shaft 90 can be rotated to a required angle with respect to the second shaft 93 and the rotated angle can be retained due to a resistance resulted from the resistance tube 92. It should be noted that the outer periphery and the inner periphery of the resistance tube 92 each respectively contributes friction against the cylinder 91 and the second shaft 93. Therefore, in practical use, the cover connected to the first shaft 90 can be pivoted to a required angle with respect to the main body connected to the second shaft 93. However, the conventional pivot can only provide a constant resistance regardless of different loads, therefore it is not suitable for different loads. For example, the resistance tube 92 may retain one kind of cover in a required pivoted angle with respect to the main body, yet not be able to retain another cover which is relatively heavier than the previous cover.

The present invention has arisen to mitigate and/or obviate the afore-described disadvantages of the conventional pivot.

SUMMARY OF THE INVENTION

The primary objective of the present invention is to provide a resistance adjustable positioning pivot whose resistance is manually adjustable for different kinds of loads.

In accordance with one aspect of the invention, there is provided a friction adjustable positioning pivot including a first shaft including a tapering threaded rod which defines a hollow space therein and a slot along an outer periphery thereof. An urging tube includes an inner threaded periphery for rotatably threading onto the tapering threaded rod of the first shaft and an inner smooth tapering periphery adjacent to the inner threaded periphery for limiting the tapering threaded rod to thread into the urging tube in a constant direction. A second shaft includes a rod portion which is received in the hollow space of the tapering threaded rod of the first shaft and is in contact with an inner periphery of the tapering threaded rod. The first shaft and the second shaft are rotatably retained at a relative angle due to a friction resulted from the rod portion of the second shaft against the inner periphery of the tapering rod of the first shaft, whereby the urging tube is allowed to be manually threaded onto the tapering rod of the first shaft thus tightening the tapering rod of the first shaft from radial direction thereby increasing friction between the first shaft and the second shaft.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
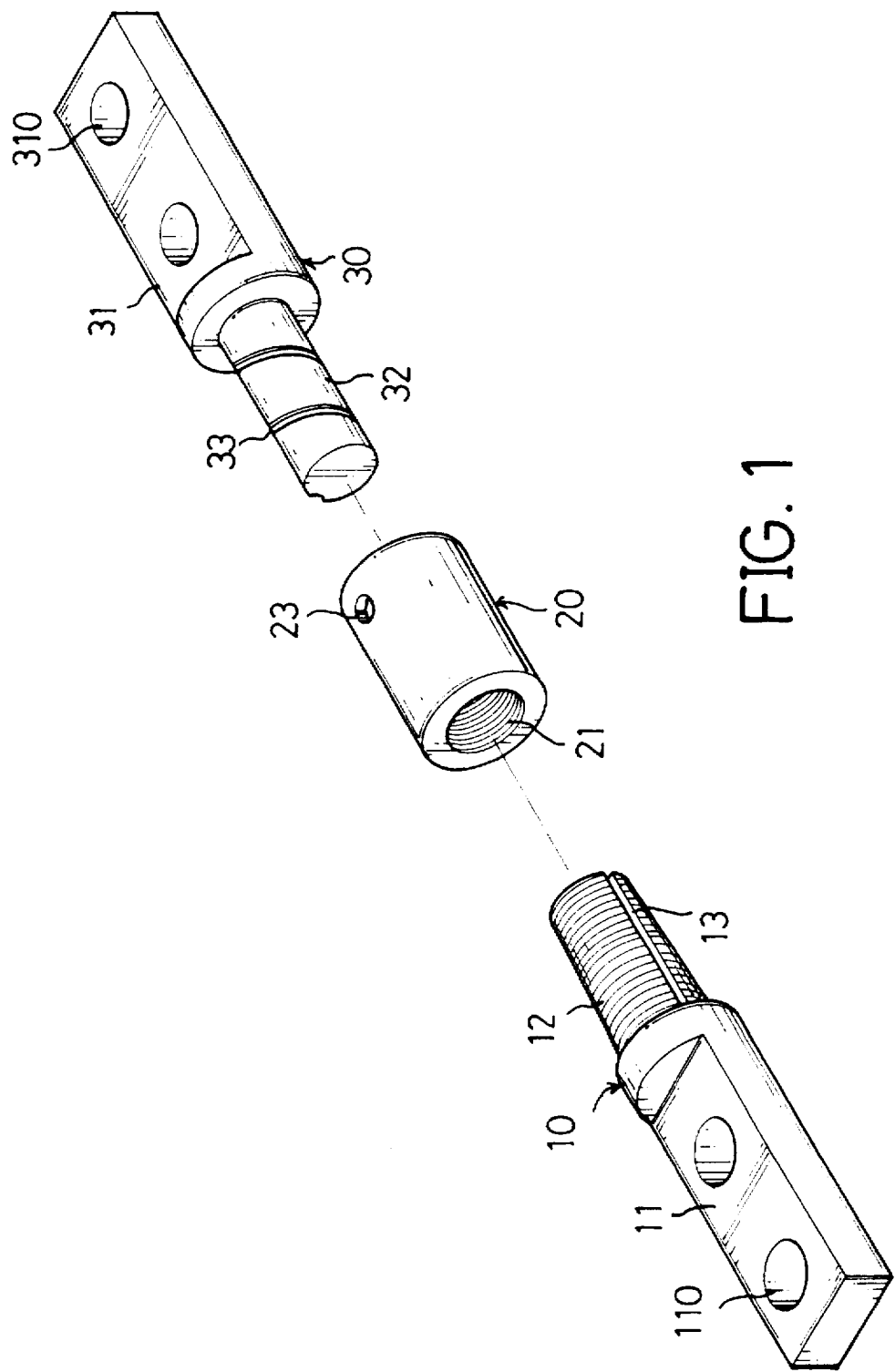
FIG. 1 is an exploded view of a resistance adjustable pivot in accordance with the present invention.

Referring to FIG. 1, a friction adjustable positioning pivot in accordance with the present invention comprises a first shaft 10, an urging tube 20, and a second shaft 30. The first shaft 10 has a flat portion 11 connected to a tapering rod portion 12. Two holes 110 are defined in the flat portion 11 and the tapering rod portion 12 has a threaded outer periphery. The tapering threaded rod portion 12 is centrally hollow and defines a longitudinal slot 13 along a periphery thereof. The urging tube 20 has an inner threaded periphery 21 for rotatably threading onto the tapering threaded rod portion 12 of the first shaft 10 and an inner smooth tapering periphery 22 (see FIG. 2) adjacent to the inner threaded periphery 21 for limiting the tapering threaded rod portion 12 of the first shaft 10 to thread into the hollow space of the urging tube 20 in a constant direction. The first shaft 10 is connected to a first half of a casing such as a screen panel of a notebook computer by fastening bolts (not shown) extending into the holes 110. The second shaft 30 has a flat portion 31 connected to a rod portion 32. Two holes 310 are defined in the flat portion 31 of the second shaft 30. The second shaft 30 is connected to a second half of a casing such as a keyboard of a notebook computer by fastening bolts (not shown) extending into the holes 310. The rod portion 32 of the second shaft 30 is received in the longitudinal hollow space of the tapering rod portion 12 of the first shaft 10. A plurality of helical grooves 33 are defined on an outer periphery of the rod portion 32 of the second shaft 30 for receiving lubricant thus preventing noise from occurring when the first shaft 10 is manually rotated with respect to the second shaft 30. It should be noted that the helical grooves 33 may be changed to another shape of groove as long as they can receive lubricant.

Figure 2:
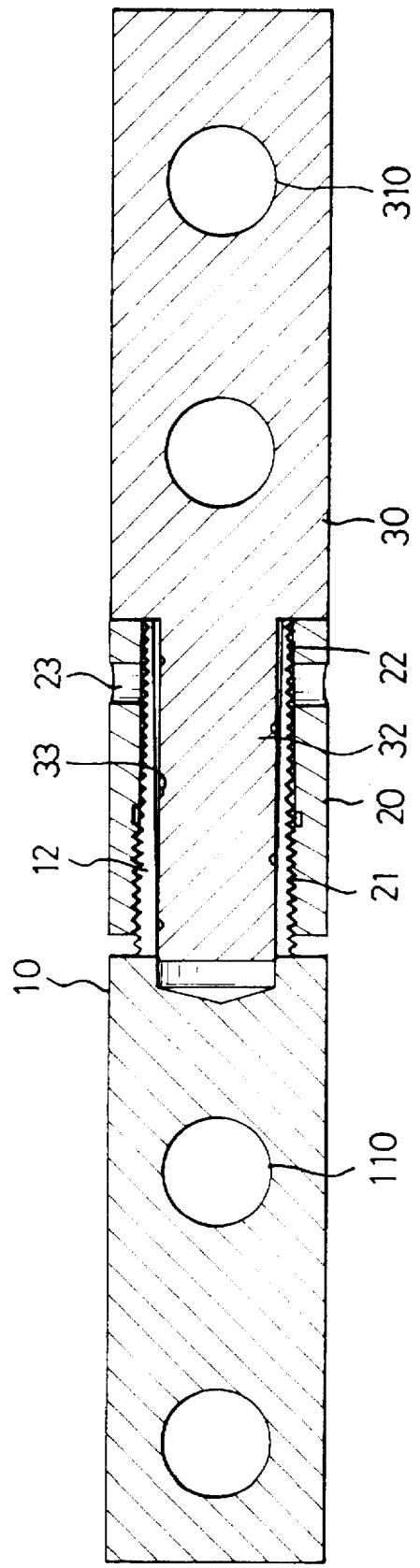
FIG. 2 is an assembled view of FIG. 1 shown in a cross-sectional view, where an urging tube is adjustable with respect to a tapering rod portion of a first shaft.

Referring to FIG. 2, the rod portion 32 of the second shaft 30 is received in the longitudinal hollow space of the tapering rod portion 12 of the first shaft 10 which is threaded into the urging tube 20. The first shaft 10 is retained in a rotational position with respect to the second shaft 30 due to friction between the first shaft 10 and the second shaft 30.

The inner threaded periphery 21 and the inner smooth tapering periphery 22 of the urging tube 20 and the tapering rod portion 12 of the first shaft 10 are so sized that when the tapering rod portion 12 of the first shaft 10 is threaded deeper into the urging tube 20, the slot 13 of the tapering rod portion 12 decreases in width thereby increasing friction between the first shaft 10 and the second shaft 30. Therefore, the friction of the positioning pivot is adjustably increased by threading the urging tube 20 deeper onto the tapering rod portion 12 of the first shaft 10. Two diametrically opposite holes 23 (only one is shown in FIG. 1) are transversely defined in the urging tube 20. A user may use a screwdriver or the like to tighten or release the friction between the first shaft 10 and the second shaft 30.

Figure 3:
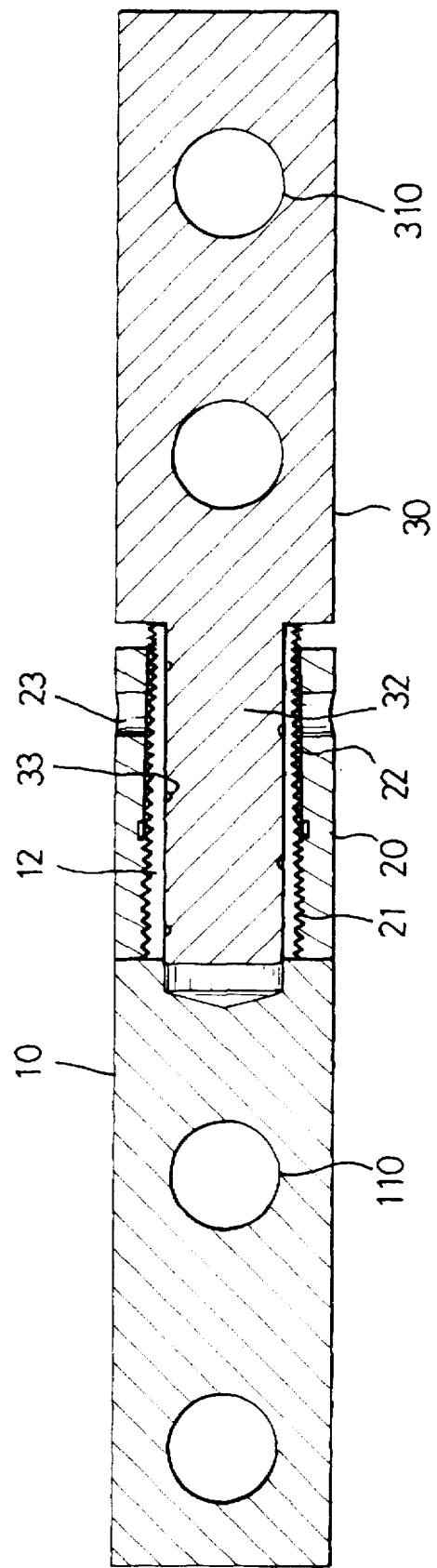
FIG. 3 illustrates the pivot of FIG. 2 adjusted to have maximum friction.
Figure 4:
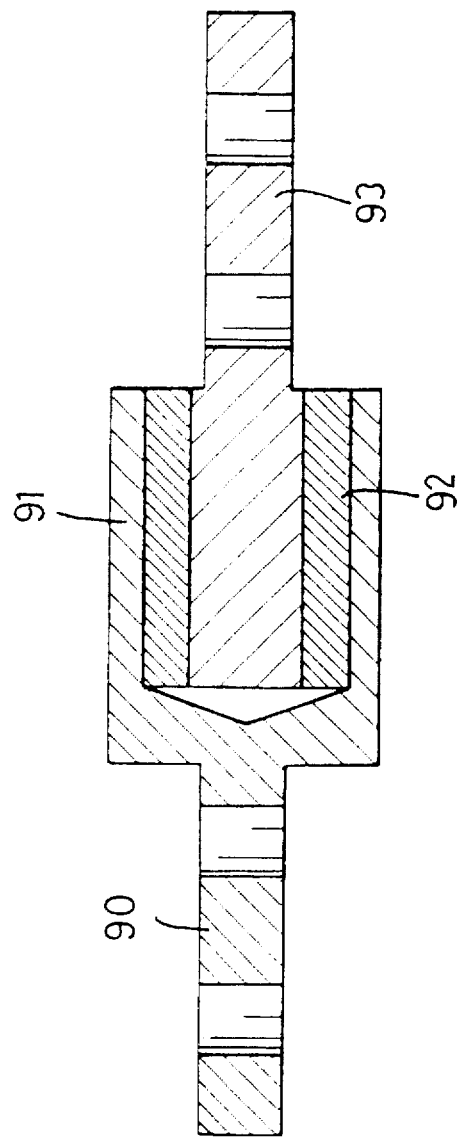
FIG. 4 is a conventional pivot shown in cross-sectional view.

FIG. 3 illustrates the urging tube 20 tightening the tapering rod portion 12 of the first shaft 10 in a tightest manner thus the pivot is adjusted to have a maximum pivotal friction.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A friction adjustable positioning pivot comprising:
    a first shaft having a tapered externally threaded rod which defines a hollow space therein and a slot extending longitudinally along a periphery thereof;
    an urging tube having an inner cylindrical threaded portion extending along a predetermined length thereof for rotatably threading onto the tapered externally threaded rod of the first shaft and an inner tapered smooth portion extending along the remaining length of the urging tube for limiting the tapered externally threaded rod to thread into the urging tube;
    a second shaft having a rod portion which is received in the hollow space of the tapered externally threaded rod of the first shaft and is in contact with an inner periphery of the tapered externally threaded rod, the rod portion of the second shaft defining a plurality of grooves in the outer periphery thereof for receiving lubricant, thus preventing noise occurring when the first shaft is manually rotated with respect to the second shaft;
    whereby the first shaft and the second shaft are rotatably retained at a relative angle due to a friction resulted from the rod portion of the second shaft against the inner periphery of the tapered externally threaded rod of the first shaft thus tightening the tapered externally threaded rod of the first shaft from radial direction thereby increasing friction between the first shaft and the second shaft.

2. A friction adjustable positioning pivot as claimed in claim 1, wherein the grooves defined in the rod portion of the second shaft are helical grooves.

* * * * *